(12) United States Patent
Bakopoulos et al.

(10) Patent No.: US 12,413,391 B2
(45) Date of Patent: Sep. 9, 2025

(54) DEVICES, SYSTEMS, AND METHODS FOR INTEGRATING ENCRYPTION SERVICE CHANNELS WITH A DATA PATH

(71) Applicant: MELLANOX TECHNOLOGIES, LTD., Yokneam (IL)

(72) Inventors: Paraskevas Bakopoulos, Ilion (GR); Dimitrios Syrivelis, Volos (GR); Ioannis (Giannis) Patronas, Pireas (GR); Elad Mentovich, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 498 days.

(21) Appl. No.: 17/686,475

(22) Filed: Mar. 4, 2022

(65) Prior Publication Data

US 2023/0269075 A1 Aug. 24, 2023

(30) Foreign Application Priority Data

Feb. 23, 2022 (GR) .............................. 20220100163

(51) Int. Cl.
*H04L 9/08* (2006.01)

(52) U.S. Cl.
CPC .......... *H04L 9/0819* (2013.01); *H04L 9/0852* (2013.01)

(58) Field of Classification Search
CPC ... H04L 9/0852; H04L 9/0858; H04L 9/0855; H04L 63/061; H04L 9/083; H04L 9/0822; H04L 9/3226; H04L 9/0891; H04L 9/14; H04L 9/0827; H04L 2209/24; H04L 9/08; H04L 9/0819; H04L 9/088; H04W 12/041; H04W 12/0431; H04W 12/0433; H04W 12/04; H04W 12/61; H04W 12/63; H04W 12/71; G06F 21/31; G06F 21/44; G06F 7/588; G06F 21/72; G06F 21/86
USPC ........ 713/171, 150, 163, 181; 726/2, 21, 36; 380/255, 264, 276
See application file for complete search history.

(56) References Cited

U.S. PATENT DOCUMENTS

| | | | | |
|---|---|---|---|---|
| 5,764,765 | A * | 6/1998 | Phoenix | H04L 9/0858 380/256 |
| 6,748,083 | B2 * | 6/2004 | Hughes | H04L 9/0858 380/278 |
| 7,437,081 | B2 * | 10/2008 | Mitchell | H04B 10/70 398/154 |
| 8,675,876 | B2 * | 3/2014 | Yamamoto | H04L 9/0858 380/278 |
| 8,855,316 | B2 * | 10/2014 | Wiseman | H04L 9/0855 380/278 |
| 9,077,577 | B1 * | 7/2015 | Ashrafi | H04B 10/532 |
| 9,356,780 | B2 * | 5/2016 | Tanizawa | H04L 63/06 |
| 9,960,465 | B2 * | 5/2018 | Dudley | H01M 50/204 |

(Continued)

*Primary Examiner* — Sharif E Ullah
(74) *Attorney, Agent, or Firm* — Sheridan Ross P.C.

(57) ABSTRACT

A system comprises a transmitter including first circuitry that generates a first frame of a first type for establishing a quantum-secure link with an endpoint according to a security protocol, a data source that generates a second frame of a second type for communicating data to the endpoint, an output that couples to the endpoint via a first communication channel, and second circuitry. The second circuitry selects either the first frame or the second frame, adds information to the selected frame that identifies the selected frame as being of the first type or the second type to form an output frame, and outputs the output frame to the output.

20 Claims, 5 Drawing Sheets

(56) References Cited

U.S. PATENT DOCUMENTS

| | | | |
|---|---|---|---|
| 10,057,058 B2* | 8/2018 | Murakami | H04L 9/0858 |
| 10,541,809 B2* | 1/2020 | Godfrey | H04L 9/0855 |
| 11,190,343 B2* | 11/2021 | Shim | H04L 9/3247 |
| 11,451,308 B1* | 9/2022 | Bucklew | H04B 10/60 |
| 2005/0138352 A1* | 6/2005 | Gauvreau | H04L 9/3247 713/153 |
| 2006/0059343 A1* | 3/2006 | Berzanskis | H04L 7/0008 713/171 |
| 2006/0085737 A1* | 4/2006 | Liu | H03M 7/30 715/234 |
| 2007/0065154 A1* | 3/2007 | Luo | H04J 14/0282 398/141 |
| 2007/0076884 A1* | 4/2007 | Wellbrock | H04L 9/0855 380/263 |
| 2007/0195774 A1* | 8/2007 | Sherman | H04L 69/16 370/392 |
| 2008/0165957 A1* | 7/2008 | Kandasamy | G06F 21/6218 713/175 |
| 2010/0299526 A1* | 11/2010 | Wiseman | H04L 63/061 713/171 |
| 2011/0206204 A1* | 8/2011 | Sychev | H04J 14/06 380/256 |
| 2011/0213979 A1* | 9/2011 | Wiseman | H04L 9/0844 713/171 |
| 2013/0101119 A1* | 4/2013 | Nordholt | H04L 9/0852 380/278 |
| 2014/0010234 A1* | 1/2014 | Patel | H04L 45/74 370/392 |
| 2014/0068765 A1* | 3/2014 | Choi | H04L 63/1416 726/23 |
| 2014/0133652 A1* | 5/2014 | Oshida | H04L 9/0897 380/255 |
| 2015/0200919 A1* | 7/2015 | Czajkowski | H04L 63/0892 713/171 |
| 2015/0271147 A1* | 9/2015 | Tanizawa | H04L 9/0852 713/171 |
| 2016/0021394 A1* | 1/2016 | Watson | H04N 13/344 348/43 |
| 2016/0127127 A1* | 5/2016 | Zhao | H04W 12/041 713/171 |
| 2016/0241396 A1* | 8/2016 | Fu | H04L 9/0836 |
| 2016/0359626 A1* | 12/2016 | Fu | H04L 9/0858 |
| 2016/0366094 A1* | 12/2016 | Mason | H04L 61/5038 |
| 2017/0214525 A1* | 7/2017 | Zhao | H04W 12/0431 |
| 2017/0230173 A1* | 8/2017 | Choi | H04L 9/0861 |
| 2018/0145753 A1* | 5/2018 | Ashrafi | H04W 12/041 |
| 2018/0176091 A1* | 6/2018 | Yoon | H04L 43/0888 |
| 2019/0036821 A1* | 1/2019 | Levy | G06F 12/0868 |
| 2019/0044763 A1* | 2/2019 | Shah | H04L 43/08 |
| 2019/0349392 A1* | 11/2019 | Wetterwald | H04L 43/0852 |
| 2020/0084222 A1* | 3/2020 | William | H04L 63/12 |
| 2020/0274701 A1* | 8/2020 | Yuan | H04L 9/0841 |
| 2020/0280436 A1* | 9/2020 | Nix | H04L 9/0869 |
| 2020/0322141 A1* | 10/2020 | Kinjo | H04L 9/0852 |
| 2021/0029741 A1* | 1/2021 | Ghosh | H04W 74/0816 |
| 2022/0006627 A1* | 1/2022 | Ko | H04L 9/0852 |
| 2022/0311752 A1* | 9/2022 | Kuang | H04L 9/0618 |
| 2023/0231664 A1* | 7/2023 | Handte | H04L 1/1887 370/329 |

* cited by examiner

DEVICES, SYSTEMS, AND METHODS FOR INTEGRATING ENCRYPTION SERVICE CHANNELS WITH A DATA PATH

CROSS REFERENCE TO RELATED APPLICATIONS

This application claims the benefit of Greek application No. 20220100163, filed on Feb. 23, 2022, which application is incorporated herein by reference in its entirety for all that it teaches and for all purposes.

FIELD OF THE DISCLOSURE

The present disclosure is generally directed to systems, devices, and methods for integrating encryption service channels with a data path, and more particular to, integrating service channels used for Quantum Key Distribution (QKD) with a data path.

BACKGROUND

Modern datacenters employ various devices and methods for high-speed data exchange that are vulnerable to malicious attacks, particularly when the data being exchanged is unencrypted.

BRIEF SUMMARY

In an illustrative embodiment, a system comprises a transmitter including first circuitry that generates a first frame of a first type for establishing a quantum-secure link with an endpoint according to a security protocol; a data source that generates a second frame of a second type for communicating data to the endpoint; an output that couples to the endpoint via a first communication channel; and second circuitry that: selects either the first frame or the second frame; adds information to the selected frame that identifies the selected frame as being of the first type or the second type to form an output frame; and outputs the output frame to the output.

In an illustrative embodiment, a method comprises generating a first frame of a first type for establishing a quantum-secure link with an endpoint according to a security protocol; generating a second frame of a second type for communicating data to the endpoint; selecting either the first frame or the second frame based on priorities of the first frame and the second frame; adding a control flit to the selected frame that identifies the selected frame as being of the first type or the second type to form an output frame; and sending the output frame over a first communication channel to the endpoint.

In an illustrative embodiment, a receiver comprises an input that receives a signal comprising a frame including at least one control flit that identifies whether the frame is of a first type for establishing a quantum-secure link with an endpoint according to a security protocol or of a second type for communicating data to the endpoint; and first circuitry that: extracts the frame from the signal based on the at least one control flit; and directs the extracted frame to a first destination that performs one or more operations for establishing the quantum secure link with the source or to a second destination that processes the data.

In an illustrative embodiment, a transmitter for communicating data to an endpoint via a communication channel comprises first circuitry that generates a first frame of a first type for establishing a quantum-secure link with the endpoint according to a security protocol; a data source that generates a second frame of a second type for communicating data to the endpoint; an output that couples to the communication channel. The transmitter comprises second circuitry that selects either the first frame or the second frame; adds to the selected frame information that identifies the selected frame as being of the first type or the second type to form an output frame; and transmits the output frame to the output.

Additional features and advantages are described herein and will be apparent from the following Description and the figures.

BRIEF DESCRIPTION OF THE DRAWINGS

The present disclosure is described in conjunction with the appended figures, which are not necessarily drawn to scale.

DETAILED DESCRIPTION

Figure 1:
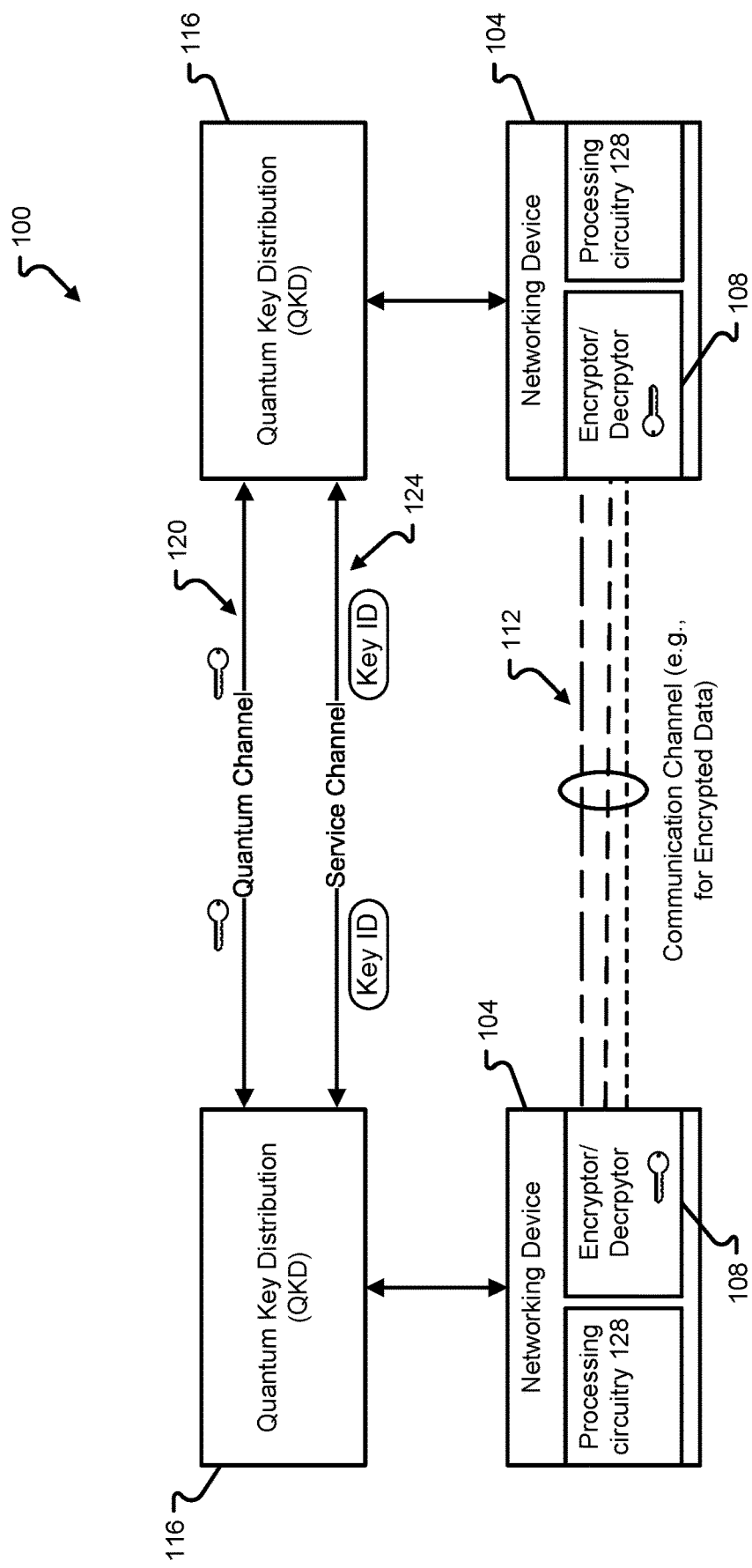
FIG. 1 illustrates a block diagram of a system according to at least one example embodiment.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Quantum Key Distribution (QKD) is a revolutionary technology that takes a different approach on confidentiality with regards to secret key exchange. Instead of depending on math intractable problems that are used by encryption ciphers to guarantee confidentiality, QKD leverages quantum mechanics properties to materialize a secure channel with a confidentiality strength that is virtually guaranteed by laws of physics. QKD technology implements secret key exchange over a quantum channel, effectively replacing existing methods of algorithmic key exchange like Diffie-Hellman. QKD devices rely on the establishment of a quantum channel between two given endpoints and a classic, authenticated channel, referred to as "service channel" that coordinates the quantum channel operation. Currently, QKD devices are bulky and even the classical service channel runs on dedicated lanes even though the volume of service channel data volume is negligible with regards to the amount of bandwidth provided by modern optical transceivers. Due to these limitations, QKD devices have been limited to use within inter-site secure communications that provide site-to-site confidentiality and provide keys to OSI layer 3 (e.g., IPsec) and OSI layer 2 (e.g., MACsec) applications. In addition, due to the centralized device deployment, the key management layer is similarly centralized. An encryptor of a local endpoint that requires a key should have an agent that negotiates the key with the local QKD device endpoint and should also communicate to the remote agent counterpart a key label, so that the same secret key can be retrieved and installed at the remote endpoint.

Inventive concepts propose devices, systems, and/or methods that enable wider adoption of QKD technology by scaling out the deployment and introducing smaller devices that can be integrated on modern network adapters, like network interface controllers (NICs). Inventive concepts propose to achieve this goal by moving the key management protocol functionalities closer to the lower layers of optical transceivers that transmit and receive data. Moving key management protocol functionality according to inventive concepts is important for yet another reason, which is isolation. Some encryptors are implemented as hardware offloading engines, and, therefore, there is no reason for software running on the host to handle the secret key that an offloading accelerator is using to encrypt/decrypt traffic on the host's behalf. The secret key management should remain isolated in hardware.

Inventive concepts relate to a system and approach for integrating QKD functionality tightly with optical transceivers. Such QKD circuitry may be implemented in a pluggable, a mid board, and/or in another suitable form factor optical transceiver unit that differs from the centralized devices that typically implement QKD protocols. Inventive concepts propose to scale out the QKD-based key management layer and integrate this management layer with datalink and physical coding sublayer designs that directly drive optical transceivers. The integration approach is generic and may operate with any datalink layer and PCS protocols that support a specific set of functionalities described herein.

A system according to inventive concepts relates to a QKD key management technique that integrates QKD service traffic with the interconnect datalink layer (DL) and Physical Coding Sublayer (PCS) of a transceiver, where the DL and PCS are hardware implementations of the transceiver that comprise the lowest level of logic before the data bits are handed over to the Serialization-Deserialization (serDES) circuitry of the transceiver. As may be appreciated, inventive concepts enable the use of a classical data channel for i) classic data transmission, ii) QKD key management, and iii) QKD quantum channel coordination, all while having a negligible bandwidth impact to standard data transmission between endpoints.

As discussed in more detail herein, at least one embodiment is directed to a confidentiality scheme that allows a tenant to create a resource enclave that spans server boundaries, which may include integrating QKD functionality inside the serDES data path to enable service channel functionality to be carried out by transceiver-attached hardware which in turn removes the need for dedicated QKD service channel lane and the need for physical layer multiplexing hardware (instead QKD service channel traffic is multiplexed in the classical channel datalink layer which requires minimal hardware logic). In addition, example embodiments provide a low-level protocol for the key management and installation after the QKD-exchanged keys and associated labels are agreed upon and delivered. Inventive concepts are protocol agnostic in the datalink layer and may be employed with any suitable interconnect or network transfer DL/PHY serDES technology (e.g., PCI-e, PCI, ethernet, and/or the like).

FIG. 1 illustrates a system 100 in which QKD devices 116 are deployed alongside networking devices 104. A communication channel 112 connects two networking devices 104. Examples of networking devices 104 include, without limitation, edge routers, switches, Network Interface Cards, Top of Rack (ToR) switches, server blades, etc. Each networking device 104 can have encryption capabilities, via an encryptor/decryptor 108, for particular ports (typically hardware accelerated to achieve high line speeds) or, alternatively, can be connected to a dedicated device serving as an encryptor for each port. Encrypted data is exchanged through the communication channel 112 directly connecting the two networking devices 104. The communication channel 112 may be a QKD secured link.

The encryptor/decryptor 108 of each networking device 104 utilizes QKD keys that have been exchanged via the QKD devices 116. The encryptor/decryptor 108 may include suitable hardware and/or software for encrypting data and storing the encrypted data on encrypted memory. The encryptor/decryptor 108 may further include suitable hardware and/or software for decrypting the data from encrypted memory. The encryptor/decryptor 108 may encrypt data from one or more Central Processing Units (CPUs) using a key received from a local root of trust over an isolated (secure) channel established with the QKD device 116. The encryptor/decryptor 108 may include encrypted memory in the form of volatile and/or non-volatile storage devices. Non-limiting examples of suitable memory devices for the encrypted memory include flash memory, Random Access Memory (RAM), variants thereof, combinations thereof, or the like. The encrypted memory may be main system memory of the networking device 104, peripheral device dedicated memory (e.g., Graphics Processing Unit (GPU) memory), encrypted storage (e.g., NVMe Over Fabric), and/or storage class memory.

The QKD keys are exchanged between the QKD devices 116 through a quantum channel 120, which may correspond to a communication channel that carries optical signals. In typical QKD applications, an additional service channel 124 between the QKD devices 116 may be used to facilitate the implementation of the QKD protocol. The service channel 124 may be used by the QKD devices 116 to exchange information about key identifiers and does not carry the actual keys. Therefore, any information exchanged via the service channel 124 will not necessarily compromise the system's 100 security. As discussed in more detail below, however, at least one example embodiment relates to integrating the traffic normally passed over the service channel 124 with traffic passed over a communication channel the same as or similar to the communication channel 112 to effectively remove the service channel 124 from the system.

Each networking device 104 may be connected to a QKD device 116 through a physical link. An illustrative, but non-limiting example of a physical link that may be used to couple a QKD device 116 to a networking device 104 is a 1 GbE LAN port. Communication between the QKD device 116 and the networking device 104 aims to provide the QKD keys and key IDs to the networking device 104 and is typically implemented according to existing standards such as the ETSI014 (also referred to as QKD014). In this standard, the QKD device 116 exposes an https server from whom the networking device 104 queries the key IDs. The QKD device 116 and the networking device 104 are located on the same site, which is considered a secure domain; therefore, the link between them does not introduce security vulnerabilities.

While illustrated and described as a network element, it should be appreciated that the networking device 104 may correspond to any type of device that becomes part of or is connected with a communication network. Other examples of suitable devices that may act or operate like a networking device 104 as described herein include, without limitation, one or more of a Personal Computer (PC), a laptop, a tablet, a smartphone, a server, a collection of servers, or the like.

The communication channel 112 is described as traversing a datacenter, but it should be appreciated that the communication channel 112 may traverse any type of communication network (whether trusted or untrusted). Examples of a communication network that may be used to connect networking devices 104 and support the communication channel 112 include, without limitation, an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), variants thereof, and/or the like. In one specific, but non-limiting example, the communication network enables data transmission between the networking devices 104 using optical signals. In this case, the networking devices 104 and the communication network may include waveguides (e.g., optical fibers) that carry the optical signals. In one specific, but non-limiting example, the communication network enables data transmission between the networking devices 104 using electrical signals. In this case, the networking devices 104 and the communication network may include conductive wires (e.g., copper wires) that carry the electrical signals. In one embodiment, the communication network enables data transmission with both electrical and optical signals.

Each networking device 104 may further include processing circuitry 128 to control various functions of the networking device 104. The processing circuitry 128 may comprise software, hardware, or a combination thereof. For example, the processing circuitry 128 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 128 may comprise hardware, such as an application specific integrated circuit (ASIC). Other non-limiting examples of the processing circuitry 128 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 128 may be provided on a Printed Circuit Board (PCB) or collection of PCBs. It should be appreciated that any appropriate type of electrical component or collection of electrical components may be suitable for inclusion in the processing circuitry 128.

Although not explicitly shown, it should be appreciated that the networking devices 104 may include other storage devices and/or processing circuitry for carrying out computing tasks, for example, tasks associated with controlling the flow of data over the communication network 112. It should be further understood that such processing circuitry may take the form of hardware and/or software in the same or similar manner as the processing circuitry 128.

In addition, although not explicitly shown, it should be appreciated that the networking devices 104 include one or more communication interfaces for facilitating wired and/or wireless communication between one another and other unillustrated elements of the system 100.

In some embodiments, the networking device 104 may be configured to include or interact with pluggable QKD devices 116, which may be connected to a front panel of the networking device 104. In this way, the QKD device 116 along with a quantum random number generator (QRNG) may represent a QKD system that is integrated (partially or completely) on the networking device 104.

As can be appreciated, various design considerations will be described in connection with different networking devices 104. It should be appreciated that any combination of approaches can be combined or portions of certain approaches may be used without departing from the scope of the present disclosure. For instance, a pluggable QKD device 116 may be used while a separate QRNG is externally connected to a networking device 104 (e.g., rather than being mounted directly adjacent to the location where the pluggable QKD device 116 will be inserted).

Figure 2:
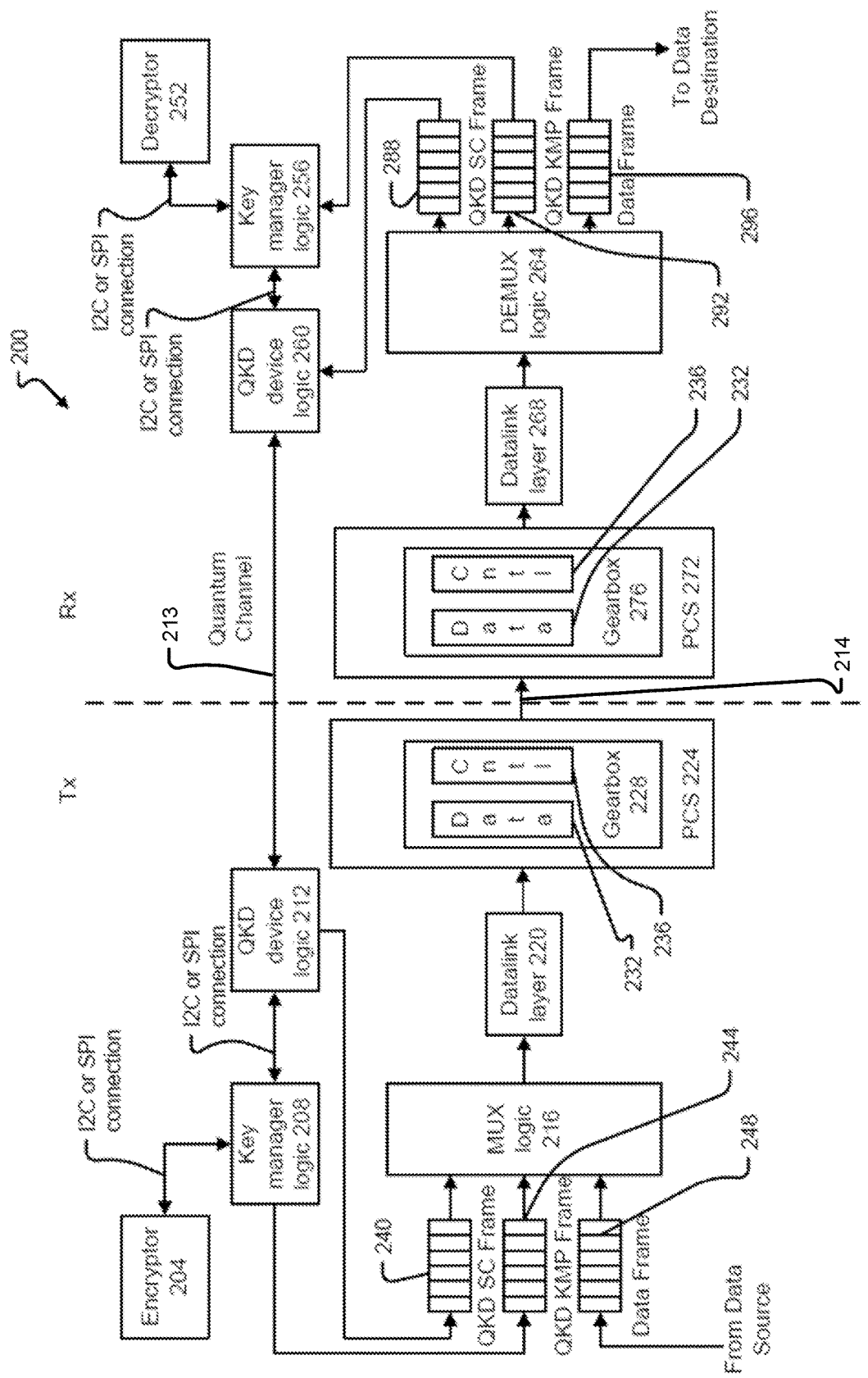
FIG. 2 illustrates a block diagram of a system according to at least one example embodiment.

FIG. 2 illustrates a system 200 according to at least one example embodiment. In general, the system 200 depicts two endpoints where one endpoint includes a transmitter Tx and the other endpoint includes a receiver Rx. The two endpoints may correspond to two networking devices 104 that exchange data over a communication link between two transceivers. For example, the transmitter Tx may correspond to a transmitting portion of an optical transceiver at one of the endpoints while the receiver Rx may correspond to a receiving portion of an optical transceiver at the other endpoint. Although not shown, the optical transceiver at the endpoint that includes the illustrated transmitter Tx may have a corresponding receiver with the same or similar structure as the illustrated receiver Rx. Meanwhile, the optical transceiver at the endpoint that includes the illustrated receiver Rx may include a corresponding transmitter with the same or similar structure as the illustrated transmitter Tx. In any event, each transceiver may comprise additional unillustrated components suitable for sending and receiving optical signals across a communication link. Such components may include a light source, a driver that drives the light source (a driver that directly modulates or indirectly modulates the light source), clock data recovery circuitry, amplification circuitry (e.g., transimpedance amplifiers (TIAs)), digital signal processing circuitry, and/or the like.

As shown, the transmitter Tx may include an encryptor 204, key manager logic 208, QKD device logic 212, MUX logic 216, datalink layer (DL) circuitry 220 (also referred to as DL 220, and physical subcoding layer (PCS) circuitry 224 (also referred to as PCS 224). The PCS 224 may include a gearbox 228 that passes one or more data flits 232 and one or more control flits 236. The data flits 232 and the control flits 236 may combine to form a packet having a size that is standard for the system 200. As shown and described in more detail below, the MUX logic 216 receives different types of frames 240, 244, and 248. Frame 240 is generated by QKD device logic 212, frame 244 is generated by key manager logic 208, and frame 248 is generated by a data source. As also discussed in more detail below, the data flits 232 may correspond to contents of one of the frames 240, 244, or 248 selected by the MUX logic 216 while the control flit 236 may be added by the MUX logic 216 to provide certain information about the selected frame. The illustrated data source may include entities associated with higher layers of the system 200 that are not the focus of the instant disclosure (e.g., entities that perform transaction layer and higher layer functions).

The receiver Rx may include a decryptor 252, key manager logic 256, QKD device logic 260, DEMUX logic 264, datalink layer (DL) circuitry 268 (also referred to as DL 268, and physical subcoding layer (PCS) circuitry 272 (also referred to as PCS 272). The PCS 272 may include a gearbox 276 that handles data flits 232 and control flits 236. As shown and described in more detail below, the DEMUX logic 216 generates frames 288, 292, and 296 from output of the DL 268, where frame 288 is sent to QKD device logic 260, frame 292 is sent to key manager logic 264, and frame 296 is sent to a data destination. Each frame 288, 292, and 296 may correspond to one of the frames 240, 244, and 248 transmitted by the transmitter Tx. The data destination may include entities associated with higher layers of the system that are not the focus of the instant disclosure (e.g., entities that perform transaction layer and higher layer functions).

The QKD device logic 212 and QKD device logic 260 are coupled to one another by a communication channel 213 which may correspond to a quantum channel (e.g., quantum channel 120 from FIG. 1) for exchanging QKD keys in accordance with the discussion of FIG. 1. In FIG. 2, however, the QKD service traffic normally exchanged over the dedicated service channel 124 from FIG. 1 is instead routed through the datalink layer (DL) and Physical Coding Sublayer (PCS) of a classical communication channel 214 that also passes data (communication channel 214 is the same as or similar to communication channel 112 in FIG. 1 that exchanges, among other signals, encrypted data for of applications running on the networking devices 104). As may be appreciated, FIG. 2 illustrates an embodiment that eliminates the need for a separate channel to carry QKD service traffic (i.e., there is no need for a channel the same as or similar to channel 124 from FIG. 1). Example operations for the system 200 are described below in more detail with reference to FIGS. 3-5.

The DL 220 and PCS 224 may include suitable hardware and/or software for carrying out layer 2 and layer 1 data transmission functions, respectively. For example, DL 220 may include logical link control (LLC) and media access control (MAC) sublayers while the PCS may be included as part of PHY layer that performs coding operations and serializing operations for frames 240, 244, and 248 for transmission to the receiver Rx.

In order to integrate QKD service traffic with normal data traffic for transmission over a classical data channel 214, example embodiments propose to incorporate a multiplexer component, such as MUX logic 216, into the data path before (or as part of) the DL 220. As may be appreciated, MUX logic 216 selects between at least three different streams or frames: data frame 248 that represents the main data traffic stream that comes from the transaction layer (illustrated as a data source), frame 244 which may correspond to key management frames generated by key manager logic 208 (annotated as "QKD KMP Frame" in FIG. 2), and frame 240 which may correspond to a QKD service channel frame that includes traffic from the QKD device logic 212 (annotated as "QKD SC Frame" in FIG. 2).

The MUX logic 216 includes suitable hardware and/or software for identifying the boundaries of each frame 240, 244, and 248, for identifying a type of frame (data frame, QKD SC frame, or QKD KMP frame), and/or for determining and/or accepting policies on how to multiplex the frames. For example, the QKD service channel frame 240 may be transmitted with priority due to the nature of the quantum channel operation, whereas the key management traffic in frame 244 may be transmitted with lesser priority. The MUX logic 216 may add information to each received frame that identifies the type of frame and the boundaries of the frame in the form of one or more flow control units (or control flits 236). A control flit 236 may be prepended to each frame by the MUX logic 216 so that when a frame is transmitted by the gear box 228, the receiver Rx has information about which type of frame follows the control flit 236 and/or the number of flits expected for the frame. This way, at the receiver Rx side, the DEMUX logic 264 can deliver the frame again to the appropriate entity: the data destination (e.g., a standard interconnect transaction layer), the key manager logic 256, or the QKD device logic 260.

Although the MUX logic 216 is illustrated separately from DL 220, it should be appreciated that the circuitry for these elements may be integrated with one another. The multiplexing scheme deployed by MUX logic 216 may be achieved with any suitable datalink layer implementation (e.g., on a PCI-e datalink layer, an Ethernet datalink layer, or a datalink layer of any other suitable interconnect technology) because most or all datalink layers, regardless of type, employ a gearbox that supports inclusion of control messages. A common gearbox employs 64B/66B encoding that transforms a 64 bit block of data into a 66 bit line code. For example, a common control message across many datalink implementations is the clock compensation control message which deals with Tx/Rx clock alignment challenges when two transceivers of respective endpoints are paired with one another. Example embodiments propose to introduce the above-described one or more extra control message at the MUX logic 216 to identify the type of frame and frame boundaries, thereby enabling frames related to QKD service channel functions to be transmitted over the same communication channel 214 as normal data and properly recognized by the receiver. These control messages may be implemented according to a suitable standard or protocol used by the gearbox 228.

The multiplexing functionality of MUX logic 216 may be enabled and disabled on demand. For example, operations related to QKD key exchange may span relatively small periods of time and the multiplexing functionality may be disabled outside of these periods so as not to consume bandwidth for passing data frames 248. In this case, the MUX logic 216 may discontinue adding control flits 236 to data frames 248 during sustained periods of transmitting only data frames 248. However, example embodiments are not limited thereto, and the MUX logic 216 may continue adding control flits 236 to the data frames 248 that identify boundaries of the data frames and/or the type of frame as a data frame during sustained periods of transmitting only data frames 248 if the control flits 236 are still of use at the receiver Rx. Disabling the MUX logic 216 is accomplished by setting the MUX logic 216 to not multiplex traffic and directly serve data frames 248 only.

The key manager logic 208 may include hardware and/or software for implementing a scaled down version of the Internet Security Association and Key Management Protocol (ISAKMP). Given that the heavy lifting of secure key exchange is done by the local QKD device 212, the key manager logic 208 has a hardware dedicated interface, such as I2C or SPI, and associated connection to QKD device logic 212 to retrieve pairs of secret keys an associated labels that are be used for coordination of key installation with the receiver Rx. The key manger logic 208 may include another separate hardware interface (again I2C or SPI) that connects with and receives remote key installation requests from an encryptor 204 or root of trust (ROT) device.

Figure 3:
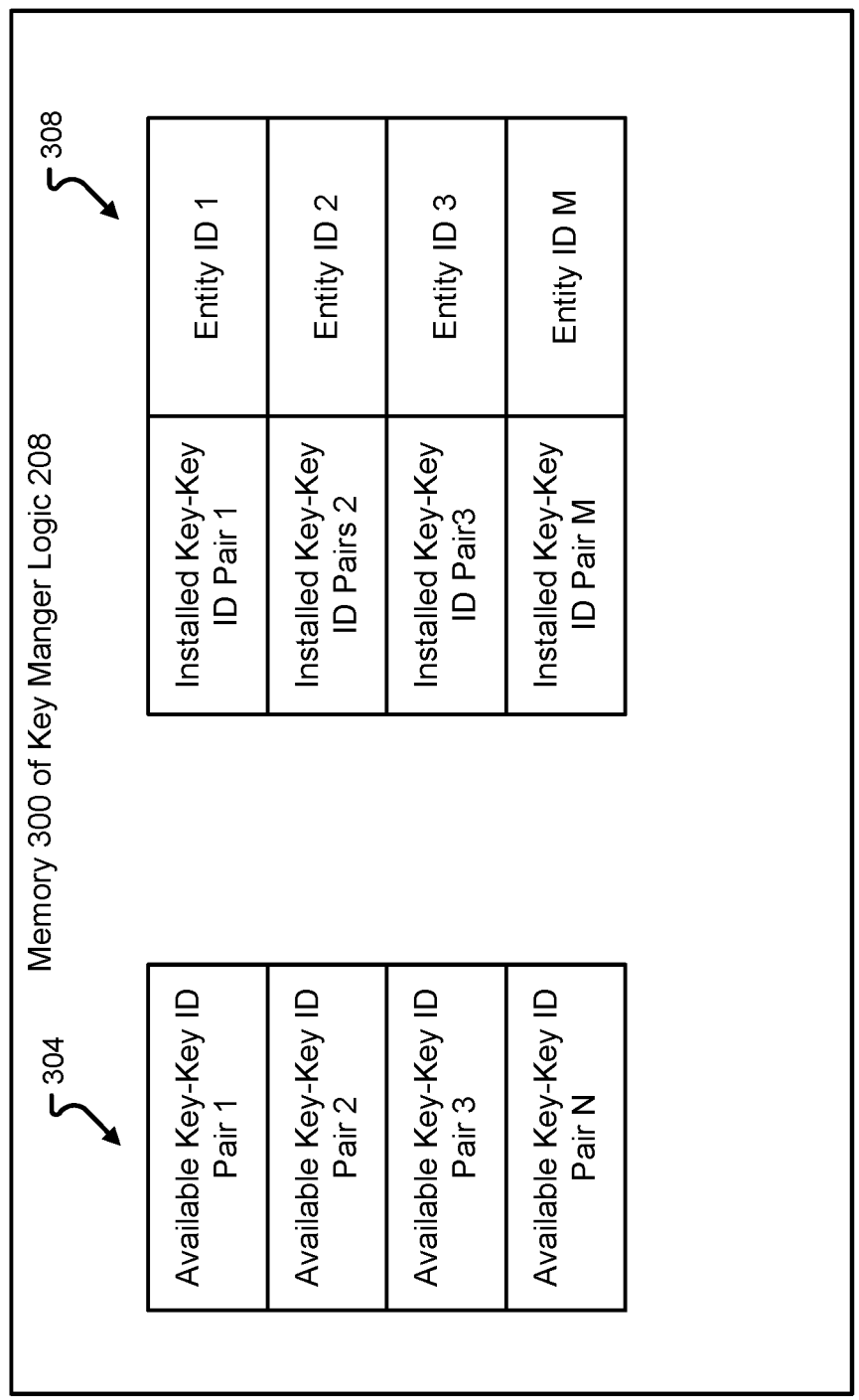
FIG. 3 illustrates additional details of the system in FIG. 2 according to at least one example embodiment.

As shown in FIG. 3, key manager logic 208 includes storage or data structures 304 and 308 that are stored on memory 300 (e.g., a scratchpad integrated memory). The first data structure 304 may correspond to a new key-label pair table (e.g., a first-in-first-out (FIFO) table) that stores N number of pairs of available keys and key IDs that have been retrieved from the local QKD device logic 216 over the I2C or SPI connection. These pairs of available keys and key IDs are not yet in use by the system 200 but are available for use as a result of a previous key exchange operation between QKD device logics 212 and 260. The same FIFO table also has a lookup table (LUT) interface so that entries may also be removed from the table by doing a key ID inquiry. The second data structure 308 may include an LUT that stores a list of installed or active keys that are in use and by which entity. As shown, the data structure 308 may include associations between M number of installed key-key ID pairs and M number of entity IDs. An entity ID may correspond to a unique identifier that identifies the entity or entities using the installed key-key ID pair. In at least one embodiment, an entity may correspond to an ID of an encryptor (e.g., encryptor 204) that is employing a particular key for exchanging encrypted data with a remote endpoint. Thus, the encryptor 204 and decryptor 252 are assigned entity IDs that are used for key negotiation with the other side.

The entity IDs may be unique so as not to clash with entity IDs of other encryptors in the system 200. The entity IDs may be generated or assigned by an orchestrator that runs out-of-band and that is responsible for the establishment of the secure channels between endpoints. Thus, the orchestrator may include hardware and/or software for servicing one or more nodes of a datacenter deployment. Notably, the orchestrator does not provide the actual secret keys to the endpoints. Instead, the orchestrator generates unique entity IDs, which are not used for other security services that run concurrently, and pushes the entity IDs to encryptor 204 and decryptor 252 that perform the actual encryption/decryption tasks. The entity IDs may be sent by encryptor 204 to the key manager logic 208 as part of the encryptor 204 retrieving the actual secret keys from the respective key manager logic 208. An eavesdropper has no use for such entity IDs because the identifiers are used for coordination of secret key installation.

A key manager logic may receive three types of requests: GETNEWKEY <secidentifier>, GETEXISTINGKEY <secidentifier> DELETEKEY <secidentifier>. Requests GETNEWKEY <secidentifier> and GETEXISTINGKEY <secidentifier> are used for secure association bring-up while request DELETEKEY <secidentifier> is used for secure association tear down. Here, "<secidentifier>" may correspond to an entity ID in FIG. 3.

The GETNEWKEY request may be received by the key manager logic 208 from the encryptor 204 asking the key manager 208 to retrieve a new key for the given security identifier <secidentifier> argument. In response to the GETNEWKEY request, the key manager logic 208 retrieves an available key-key ID pair from the data structure 304 of available keys and installs the key-key ID pair on the active key LUT along with the security identifier <secidentifier> as the entity ID in data structure 308 (effectively removing the key-key ID pair from data structure 304 while associating the key-key ID pair with encryptor 204 in data structure 308). Subsequently, the key manager logic 208 sends a message that includes an indication of the key ID and the security identifier <secidentifier> through the MUX logic 216 in a frame 244 to the remote key manager logic 256 with a request to reserve the key that corresponds to the sent key ID and to associate the key with the sent security identifier <secidentifier>. In accordance with example embodiments, the MUX logic 216 adds one or more control flits 236 to the frame 244 so that the frame 244 is identifiable by the DEMUX logic 264 as being destined for key manager logic 256.

The key manager logic 256 may include the same or similar data structures 304 and 308 as key manager logic 208 so that the key manager logic 256 has the same ability to lookup a key using the received key ID. For example, the key manager logic 256 may use the received key ID and/or security identifier <secidentifier> to retrieve the appropriate key for installation on the decryptor 252 while moving the key-key ID pair from the available key data structure to the active key data structure. Once the decryptor 252 installs the key (see operations for GETEXISTINGKEY below), the key manager logic 256 sends a response back through a transmitter Tx of the remote endpoint (not shown, but having the same or similar structure as transmitter Tx) so that the response returns the <secret key> for the sent <secidentifier>. The response may be sent through MUX logic of the remote endpoint that is identical to MUX logic 216 so that at least one control flit is added to the response to again identify the type of frame and/or the frame's boundaries. When the key manager logic 208 receives the response, the key may be immediately used by the encryptor 204 as the key is guaranteed to be installed by decryptor 252 of the remote endpoint. This type of blocking behavior where the key-requesting entity (e.g., encryptor 204) cannot use the key until receiving the above-mentioned response from the remote endpoint is important for the synchronization of key installation. As may be appreciated, the GET-NEWKEY request should be issued by the endpoint that desires to send encrypted traffic to another endpoint so that the key is not used to encrypt traffic until the response is received from the remote endpoint that the key is installed.

The GETEXISTINGKEY <secidentifier> request may be issued by key manager logic 256 to retrieve keys from the transmitter Tx for the purpose of setting up a new key or to setup a rekey for decryptor 252. The response of GETEXISTINGKEY from transmitter Tx returns a key that has been already securely exchanged and is stored in the active local lookup table of data structure 308. If an available key is not in the data structure 308 of key manager logic 208, the response is deferred until the remote message of GETNEWKEY (see above) has arrived from the transmitter Tx and the appropriate active key/key-ID entry is in place. The GETEXISTING request or command may be issued by decryptor side (i.e., of the receiver Rx), as the successful response to the request will trigger the key installation on the transmitter side that issued GETNEWKEY (see above). Therefore, the decryption side or receiver side installs the proper key with priority.

The DELETEKEY <secidentifier> request triggers a local teardown of active key-key ID pairs and may be sent by the orchestrator to a key manager logic (e.g., 208 and/or 256) when a channel encrypted with an active key is no longer in use or no longer needed.

The three above-described requests are indicative of the functionality supported by the system 200 and may be implemented in any suitable manner.

As may be appreciated from the above description, key manager logic 208 and 256 offer isolation from other components of the system 200 by using dedicated hardware communication interfaces (e.g., I2C or SPI) for communicating with encryption/decryption components and QKD devices 212/260. The initiating key manager logic (key manager logic 208 in the example of FIG. 2) implements a relatively simple communication protocol with the remote endpoint so that only two messages are exchanged between endpoints per key installation while offering synchronization of key installation to ensure that an encryptor begins encrypting traffic at the proper time.

Key updates (or re-keying) may be implemented by issuing a request with a new security identifier <secidentifier> (e.g., a new entity ID). These requests are issued by key manager logic 208 and/or 256 that handle the security key installation for the secure tunnels that have been previously established by external software.

Figure 4:
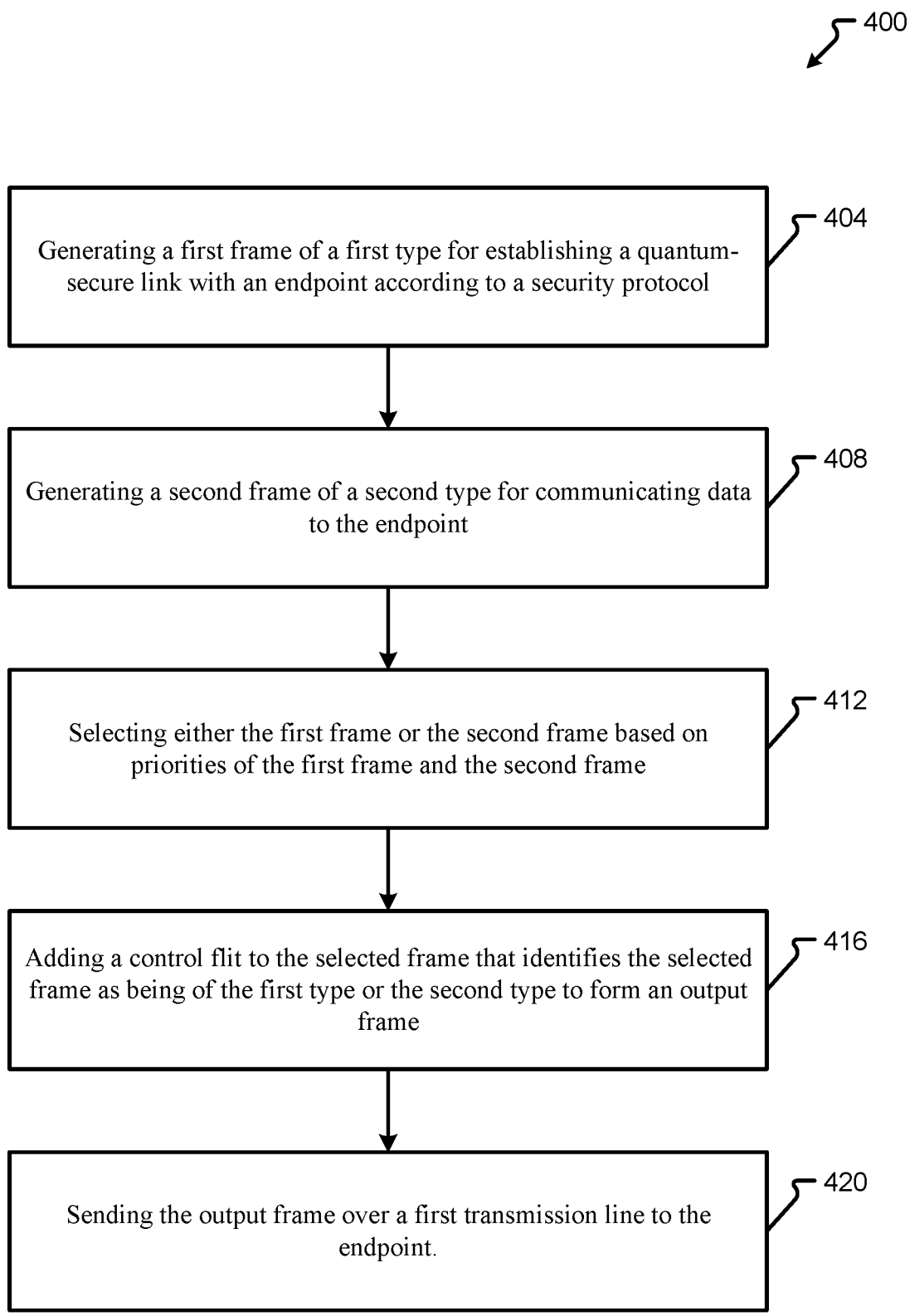
FIG. 4 illustrates a method for a transmitter according to at least one example embodiment.

FIG. 4 illustrates a method 400 according to at least one example embodiment.

While a general order for the steps of the method 400 is shown in FIG. 4, the method 400 can include more or fewer steps or can arrange the order of the steps differently than those shown in FIG. 4. The operations discussed with respect to FIG. 4 may be implemented by the various elements of the system(s) in FIGS. 1-3 (e.g., the system 200 in FIG. 2). For example, the method 400 may be implemented by a transmitter Tx of a transceiver of a networking device 104. Hereinafter, the method 400 shall be explained with reference to the systems, components, assemblies, devices, user interfaces, environments, software, etc. described in conjunction with FIGS. 1-3.

Operation 404 includes generating a first frame of a first type for establishing or generally maintaining a quantum-secure link with an endpoint according to a security protocol. For example, first circuitry, which may correspond to the QKD device logic 212 of the transmitter Tx, generates the first frame of the first type as QKD SC frame 240, which is for establishing or maintaining the quantum-secure link with the endpoint connected to receiver Rx according to QKD protocols.

Operation 408 includes generating a second frame of a second type for communicating data to the endpoint. For example, the data source generates the second frame of the second type as data frame 248 for communicating data to the endpoint in accordance with suitable transaction layer and/or higher layer protocols. In at least one example, the data source includes data generated by an application running on a networking device 104 connected to the transmitter Tx for sending to an application running on another networking device 104 connected to the receiver Rx.

Operation 412 includes selecting either the first frame 240 or the second frame 248 based on priorities of the first frame 240 and the second frame 248. For example, second circuitry, which may correspond to the MUX logic 216, selects the first frame 240 or the second frame 248 according to respective priorities of each frame. As noted above, each frame 240, 244, and 248 may have an associated priority that can affect the order in which frames are selected by the MUX logic 216 when frames of different types are input to the MUX logic 216 at the same time or within a relatively narrow time window. For example, QKD service channel information within frame 240 may have the highest priority, key management information within frame 244 may have a next highest priority, and data within frame 248 may have the lowest priority. However, example embodiments are not limited thereto, and the priorities of frames may vary according to design preferences.

In at least one embodiment, frame 240 may correspond to a frame for a low level QKD synchronization protocol that includes information on how the communication channel 213 (e.g., a quantum channel the same as or similar to quantum channel 120) should be read at the receiver Rx side that implements the actual key transfer functionalities. For example, frame 240 includes information about polarities of the single photon detectors used by QKD devices 116 to detect optical signals received from the communication channel 213. Frame 244 may include information for key-exchange management synchronization and installation between endpoints (see, for example, functionalities of key manager logic 208 and/or 256). Finally, frame 248 may include regular payload data being passed between applications running on each endpoint. In general, each depicted rectangle in the frames of FIG. 2 corresponds to a flit (e.g., a data flit). Notably, the data frame 248 may include data encrypted according to QKD protocols and/or other suitable encryption protocols. The data frame 248 may be sent to one of many possible destinations at the remote endpoint, where a destination may correspond to an application running on a processing resource of the remote endpoint.

Operation 416 includes adding at least one control flit to the selected frame that identifies the selected frame as being of the first type or the second type to form an output frame. For example, the MUX logic 216 may prepend at least one control flit 236 to the frame selected in operation 408 so that the gearbox 228 outputs control flits 236 prior to data flits 232 of the selected frame. In addition to identifying the type of frame selected by the MUX logic 216, the at least one control flit 236 may further identify boundaries of the selected frame so that the receiver Rx can properly identify the type and the size of the frame upon receipt. For example, the at least one control flit 236 may include a field with information that identifies how many total flits (i.e., a sum of control flits 236 and data flits 232) are in the selected frame. Additionally or alternatively, designated header and trailer flits within each frame may identify frame boundaries.

Operation 420 includes sending the output frame formed in operation 416 over a first communication channel to the endpoint. For example, the output frame is sent by circuitry, which may correspond to the gearbox 228 of PCS 224, over a communication channel 214 that also carries regular data (e.g., as data frames 248). This effectively eliminates the need for the typical dedicated communication channel for sending QKD related frames, such as frames 240 and/or 244.

Figure 5:
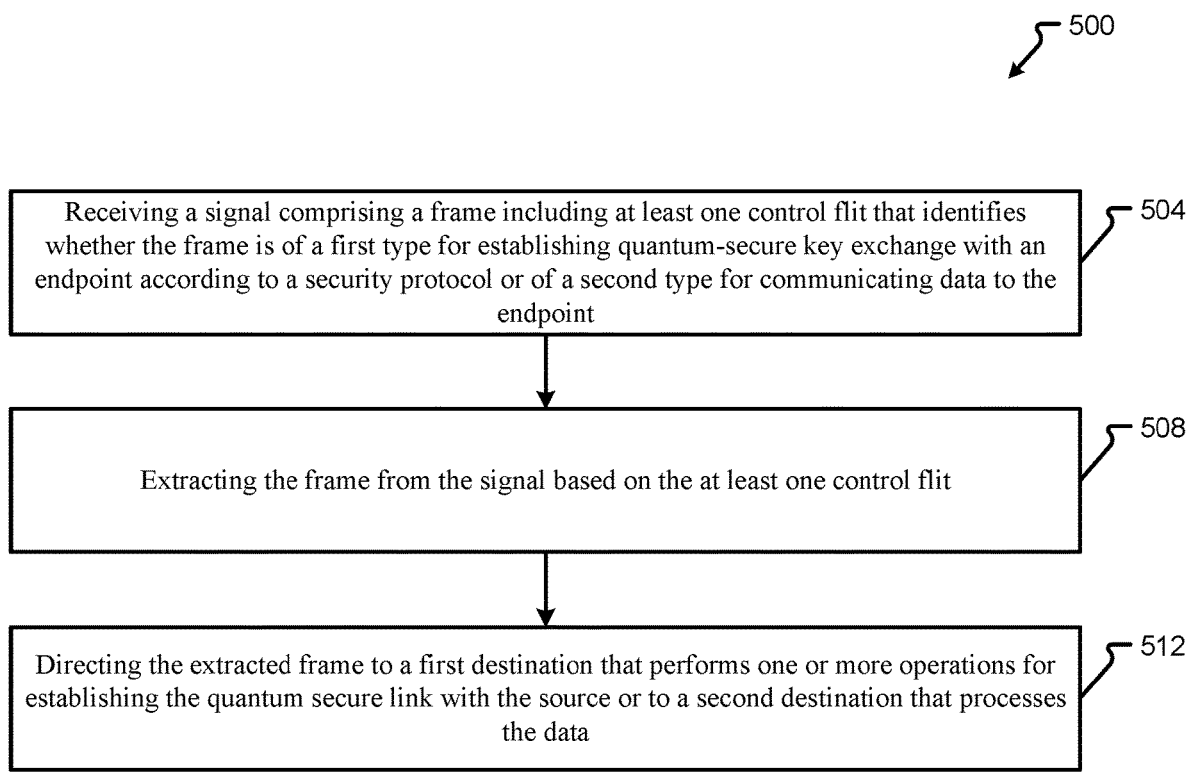
FIG. 5 illustrates a method for a receiver according to at least one example embodiment.

FIG. 5 illustrates a method 500 according to at least one example embodiment.

While a general order for the steps of the method 500 is shown in FIG. 5, the method 500 can include more or fewer steps or can arrange the order of the steps differently than those shown in FIG. 5. The operations discussed with respect to FIG. 5 may be implemented by the various elements of the system(s) in FIGS. 1-3 (e.g., the system 200 in FIG. 2). For example, the method 500 may be implemented by a receiver Rx of a transceiver of a networking device 104. Hereinafter, the method 500 shall be explained with reference to the systems, components, assemblies, devices, user interfaces, environments, software, etc. described in conjunction with FIGS. 1-3.

Operation 500 includes receiving a signal comprising a frame including at least one control flit 236 that identifies whether the frame is of a first type for establishing or maintaining a quantum-secure link with an endpoint according to a security protocol or of a second type for communicating data to the endpoint. As may be appreciated, a frame having the first type may correspond to frame 240 (or frame 244) while a frame having the second type may correspond to frame 248. The signal comprising the frame may be received at an input of the PCS 272, for example, by an input of the gearbox 276 as sent over the communication channel 214 between PCS 224 and 272 communication channel. The frame within the signal may correspond to an output frame output from the gearbox 228.

Operation 508 includes extracting the frame from the signal based on the at least one control flit 236. For example, circuitry that corresponds to the DEMUX logic 264 may extract the frame from the signal using information about the type of frame and/or boundaries of the frame included in the at least one control flit 236. In at least one embodiment, the DEMUX logic 264 identifies the type of frame as one of frames 240, 244, or 248 based on information in the control flit 236 and extracts the frame from the signal using information in the control flit 236 that identifies the boundaries of the frame. Identifying the type of frame enables the DEMUX logic 264 to output the frame to the correct destination (e.g., to key manager logic 256, QKD device logic 260, or a data destination.

Operation 512 includes directing the extracted frame to a first destination that performs one or more operations for establishing the quantum secure link with the source or to a second destination that processes the data. For example, the DEMUX logic 264 determines a destination for the frame as the key manager logic 256, the QKD device logic 260, or the data destination based on the identified type of frame and frame boundaries determined in operation 508, and then directs the frame to the correct output of the DEMUX logic 264. Thereafter, the frame is processed by the appropriate destination for the purpose of servicing a QKD link between the endpoints (i.e., the destination is the key manager logic 256 or the QKD device 260) or for regular data processing (i.e., the destination is the data destination).

Although not explicitly illustrated in FIGS. 4 and 5, it should be appreciated that the system 200 may perform one or more key exchange operations with the endpoint according to QKD protocols over a communication channel that is different from the communication channel that carries frames 240, 244, and/or 248. For example, prior to operation 404, the actual keys for establishing a quantum-secure link may be sent over a dedicated quantum channel (e.g., communication channel 213) or other suitable channel that is different from the communication channel 214 over which frames 240, 244, and 248 are sent. Thereafter, the system 200 may perform the methods 400 and 500 to coordinate installation of the keys at each endpoint.

In view of FIGS. 1-5, it should be appreciated that example embodiments provide a system including a transmitter Tx. The transmitter Tx includes first circuitry 212 that generates a first frame 240 of a first type for establishing and/or generally maintaining a quantum-secure link with an endpoint according to a security protocol (e.g., a QKD protocol). The transmitter Tx further includes a data source that generates a second frame 248 of a second type for communicating data to the endpoint, and an output that couples to the endpoint via a first communication channel 214. In one embodiment, the output comprises a gearbox 228 that sends the output frame to the first communication channel 214. In accordance with example embodiments, the first circuitry 212 is configured to perform one or more key exchange operations with the endpoint over a second communication channel 213 different from the first communication channel 214.

The transmitter 200 includes second circuitry (e.g., MUX logic 216) that selects either the first frame 240 or the second frame 248, adds information to the selected frame that identifies the selected frame as being of the first type or the second type to form an output frame, and outputs the output frame to the output where the output frame may be transmitted in a signal along with one or more other frames in a serial fashion. In accordance with example embodiments, the information may comprise a control flit 236 prepended to the selected frame. In addition, the second circuitry 216 may identify boundaries of the selected frame and include information that identifies the boundaries in the control flit. For example, the control flit identifies a number of flits in the selected frame (e.g., a total number of data flits and control flits).

In at least one example, the second circuitry 216 selects either the first frame or the second frame based on a first priority associated with the first frame and a second priority associated with the second frame. The second circuitry 216 may comprise a multiplexer and circuitry (e.g., data link layer 220) for performing one or more datalink layer functions. That is, the circuitry for datalink layer 220 may be integrated with the MUX logic 216.

The transmitter Tx may further include third circuitry 208 that generates a third frame 244 of a third type for establishing and/or maintaining the quantum-secure link according to the security protocol. In this case, the second circuitry 216 selects either the first frame 240, the second frame 248, or the third frame 244 for output by the output. The third circuitry 208 is coupled to the first circuitry 212 and is configured to perform one or more key management operations for the one or more key exchange operations.

In at least one embodiment, the third circuitry 208 comprises a memory 300 including a first data structure 304 that identifies available keys and associated key identifiers. The memory 300 may further include a second data structure 308 that identifies installed keys and associated entity identifiers that identify entities using the installed keys.

The system 200 may further comprise a receiver Rx for the endpoint. The receiver Rx includes an input that receives a signal comprising the selected frame over the first communication channel 214 and circuitry 264 that extracts the selected frame from the signal based on the information added to the selected frame by the circuitry 216. The circuitry 264 may direct the selected frame extracted from the signal to a respective destination (e.g., QKD device logic 260, key manager logic 256, or the data destination).

In view of FIGS. 1-5, it should be appreciated that example embodiments provide a method that includes generating a first frame 240 (or 244) of a first type for establishing or maintaining a quantum-secure link with an endpoint according to a security protocol (e.g., QKD protocol), generating a second frame 248 of a second type for communicating data to the endpoint, selecting either the first frame or the second frame based on priorities of the first frame and the second frame, adding a control flit 236 to the selected frame that identifies the selected frame as being of the first type or the second type to form an output frame, and sending the output frame over a first communication channel 214 to the endpoint. As noted above, circuitry 216 selects the selected frame and adds the control flit and circuitry 228 sends the output frame over the first communication channel 214 to the endpoint. The method may further include performing one or more key exchange operations with the endpoint according to the security protocol over a second communication channel 213 different from the first communication channel 214.

In view of FIGS. 1-5, it should be appreciated that example embodiments provide a receiver Rx comprising an input that receives a signal comprising a frame including at least one control flit 236 that identifies whether the frame is of a first type for establishing a quantum-secure link with an endpoint according to a security protocol or of a second type for communicating data to the endpoint. The receiver Rx includes circuitry 264 that extracts the frame from the signal based on the at least one control flit; and directs the extracted frame to a first destination that performs one or more operations for establishing the quantum secure link with the source or to a second destination that processes the data.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

It should be appreciated that inventive concepts cover any embodiment in combination with any one or more other embodiment, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment.

Example embodiments may be configured as follows:

(1) A system, comprising:
a transmitter including:
first circuitry that generates a first frame of a first type for establishing a quantum-secure link with an endpoint according to a security protocol;
a data source that generates a second frame of a second type for communicating data to the endpoint;
an output that couples to the endpoint via a first communication channel; and
second circuitry that:
selects either the first frame or the second frame;
adds information to the selected frame that identifies the selected frame as being of the first type or the second type to form an output frame; and
outputs the output frame to the output.

(2) The system of (1), wherein the second circuitry selects either the first frame or the second frame based on a first priority associated with the first frame and a second priority associated with the second frame.

(3) The system of one or more of (1) to (2), wherein the second circuitry identifies boundaries of the selected frame.

(4) The system of one or more of (1) to (3), wherein the second circuitry comprises a multiplexer and circuitry for performing one or more datalink layer functions.

(5) The system of one or more of (1) to (4), wherein the output comprises a gearbox that sends the output frame to the first communication channel.

(6) The system of one or more of (1) to (5), wherein the transmitter further comprises:
third circuitry that generates a third frame of a third type for the quantum-secure link according to the security protocol, wherein the second circuitry selects either the first frame, the second frame, or the third frame for output by the output.

(7) The system of one or more of (1) to (6), wherein the first circuitry is configured to perform one or more key exchange operations with the endpoint over a second communication channel different from the first communication channel.

(8) The system of one or more of (1) to (7), wherein the third circuitry is coupled to the first circuitry and is configured to perform one or more key management operations for the one or more key exchange operations.

(9) The system of one or more of (1) to (8), wherein the third circuitry comprises a memory including a first data structure that identifies available keys and associated key identifiers.

(10) The system of one or more of (1) to (9), wherein the memory includes a second data structure that identifies installed keys and associated entity identifiers that identify entities using the installed keys.

(11) The system of one or more of (1) to (10), wherein the information comprises a control flit prepended to the selected frame.

(12) The system of one or more of (1) to (11), wherein the control flit identifies a number of flits in the selected frame.

(13) The system of one or more of (1) to (12), further comprising:
a receiver for the endpoint and including:
an input that receives a signal comprising the selected frame over the first communication channel; and
third circuitry that extracts the selected frame from the signal based on the information added to the selected frame.

(14) The system of one or more of (1) to (13), wherein the third circuitry:
directs the selected frame extracted from the signal to a respective destination.

(15) The system of one or more of (1) to (14), wherein the information identifies a number of flits in the selected frame.

(16) A method, comprising:
generating a first frame of a first type for establishing a quantum-secure link with an endpoint according to a security protocol;
generating a second frame of a second type for communicating data to the endpoint;
selecting either the first frame or the second frame based on priorities of the first frame and the second frame;
adding a control flit to the selected frame that identifies the selected frame as being of the first type or the second type to form an output frame; and
sending the output frame over a first communication channel to the endpoint.

(17) The method of (16), wherein first circuitry selects the selected frame and adds the control flit, and wherein second circuitry sends the output frame over the first communication channel to the endpoint.

(18) The method of one or more of (16) to (17), wherein the control flit identifies boundaries of the selected frame.

(19) The method of one or more of (16) to (18), further comprising:
performing one or more key exchange operations with the endpoint according to the security protocol over a second communication channel different from the first communication channel.

(20) A receiver, comprising:
an input that receives a signal comprising a frame including at least one control flit that identifies whether the frame is of a first type for establishing a quantum-secure link with an endpoint according to a security protocol or of a second type for communicating data to the endpoint; and
first circuitry that:
extracts the frame from the signal based on the at least one control flit; and
directs the extracted frame to a first destination that performs one or more operations for establishing the quantum secure link with the source or to a second destination that processes the data.

(21) A transmitter for communicating data to an endpoint via a communication channel, the transmitter comprising:
first circuitry that generates a first frame of a first type for establishing a quantum-secure link with the endpoint according to a security protocol;
a data source that generates a second frame of a second type for communicating data to the endpoint;
an output that couples to the communication channel; and
second circuitry that:
selects either the first frame or the second frame;
adds to the selected frame information that identifies the selected frame as being of the first type or the second type to form an output frame; and
transmits the output frame to the output.

What is claimed is:

1. A system, comprising:
a transmitter including:
first circuitry that generates a first frame of a first type for establishing a quantum-secure link with an endpoint according to a security protocol;
a data source that generates a second frame of a second type for communicating data to the endpoint;
an output that couples to the endpoint via a first communication channel; and
second circuitry that:
selects either the first frame or the second frame;
adds information to the selected frame that identifies the selected frame as being of the first type or the second type to form an output frame; and
outputs the output frame to the output.

2. The system of claim 1, wherein the second circuitry selects either the first frame or the second frame based on a first priority associated with the first frame and a second priority associated with the second frame.

3. The system of claim 1, wherein the second circuitry identifies boundaries of the selected frame.

4. The system of claim 1, wherein the second circuitry comprises a multiplexer and circuitry for performing one or more datalink layer functions.

5. The system of claim 1, wherein the output comprises a gearbox that sends the output frame to the first communication channel, and wherein the first frame comprises service traffic for establishing the quantum-secure link.

6. The system of claim 1, wherein the transmitter further comprises:
third circuitry that generates a third frame of a third type for the quantum-secure link according to the security protocol, wherein the second circuitry selects either the first frame, the second frame, or the third frame for output by the output.

7. The system of claim 6, wherein the first circuitry is configured to perform one or more key exchange operations with the endpoint over a second communication channel different from the first communication channel.

8. The system of claim 7, wherein the third circuitry is coupled to the first circuitry and is configured to perform one or more key management operations for the one or more key exchange operations.

9. The system of claim 8, wherein the third circuitry comprises a memory including a first data structure that identifies available keys and associated key identifiers.

10. The system of claim 9, wherein the memory includes a second data structure that identifies installed keys and associated entity identifiers that identify entities using the installed keys.

11. The system of claim 1, wherein the information comprises a control flit prepended to the selected frame, and wherein the second frame comprises data encrypted with the security protocol.

12. The system of claim 11, wherein the control flit identifies a number of flits in the selected frame.

13. The system of claim 1, further comprising:
a receiver for the endpoint and including:
an input that receives a signal comprising the selected frame over the first communication channel; and
third circuitry that extracts the selected frame from the signal based on the information added to the selected frame.

14. The system of claim 13, wherein the third circuitry:
directs the selected frame extracted from the signal to a respective destination.

15. The system of claim 13, wherein the information identifies a number of flits in the selected frame.

16. A method, comprising:
generating a first frame of a first type for establishing a quantum-secure link with an endpoint according to a security protocol;
generating a second frame of a second type for communicating data to the endpoint;
selecting either the first frame or the second frame based on priorities of the first frame and the second frame;
adding a control flit to the selected frame that identifies the selected frame as being of the first type or the second type to form an output frame; and
sending the output frame over a first communication channel to the endpoint.

17. The method of claim 16, wherein first circuitry selects the selected frame and adds the control flit, and wherein second circuitry sends the output frame over the first communication channel to the endpoint.

18. The method of claim 16, wherein the control flit identifies boundaries of the selected frame, wherein the first frame comprises service traffic for establishing the quantum-secure link, and wherein the second frame comprises data encrypted with the security protocol.

19. The method of claim 16, further comprising:
performing one or more key exchange operations with the endpoint according to the security protocol over a second communication channel different from the first communication channel.

20. A transmitter for communicating data to an endpoint via a communication channel, the transmitter comprising:
first circuitry that generates a first frame of a first type for establishing a quantum-secure link with the endpoint according to a security protocol;
a data source that generates a second frame of a second type for communicating data to the endpoint;
an output that couples to the communication channel; and
second circuitry that:
selects either the first frame or the second frame;
adds, to the selected frame, information that identifies the selected frame as being of the first type or the second type to form an output frame; and
transmits the output frame to the output.

* * * * *